2,914,527
SULFONIUM COMPOUNDS

Stanley O. Winthrop, Montreal, Quebec, and Martin Arnold Davis, Outremont, Quebec, Canada, assignors to American Home Products Corporation, New York, N.Y., a corporation of Delaware No Drawing. Application February 4, 1958
Serial No. 713,778

21 Claims. (Cl. 260—243)

This invention relates to new sulfonium compounds which possess valuable therapeutic properties. More particularly, certain of these new compounds, the ω-(10-phenothiazinyl)alkyl dialkylsulfonium salts, are valuable in medicine as spasmolytics and antihistaminics. Certain of the other novel chemical compounds with which this invention is concerned are useful as intermediates in preparing these therapeutically active ω-(10-phenothiazinyl)alkyl dialkylsulfonium salts.

Our invention is also concerned with the novel methods by which these new chemical compounds may be prepared.

Our new therapeutically-active chemical compounds, the ω-(10-phenothiazinyl)alkyl dialkylsulfonium salts, which are useful as spasmolytics and, in particular, as antihistaminics, are chemical compounds of the following formula:

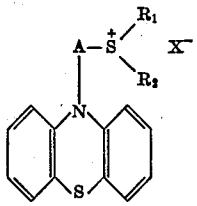

wherein A is a lower alkylene group (preferably a divalent straight or branched aliphatic chain containing 2 to 3 carbon atoms); $R_1$ and $R_2$ represent the same or different lower alkyl radicals; and X represents bromine or iodine.

In preparing these novel sulfonium compounds we utilize, as the starting material, the ω-(10-phenothiazinyl) alkyl halides. These known compounds and the methods by which they may be prepared are described in the chemical literature as, for example, in the article of Dahlbom, Acta Chem. Scand. vol. 3 (1949), page 247.

In preparing the therapeutically active ω-(10-phenothiazinyl)alkyl dialkylsulfonium salts, more particularly the halide salts, we may utilize either of two suitable methods, each starting with an ω-(10-phenothiazinyl) alkyl halide. In one of these methods the ω-(10-phenothiazinyl)alkyl halide is reacted with a sodium alkyl mercaptide to form the ω-(10-phenothiazinyl) lower alkyl alkylsulfide. This intermediate compound is then reacted with an alkyl halide to form the desired ω-(10-phenothiazinyl)alkyl dialkylsulfonium halide.

This series of reactions may be indicated as follows:

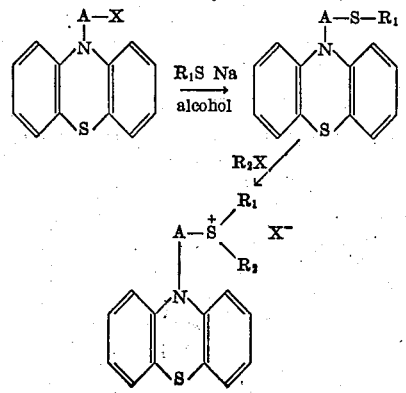

wherein A is lower alkylene as defined above, $R_1$ and $R_2$ represent the same or different lower alkyl radicals, and X represents bromine or iodine.

In accordance with our second method for preparing the new ω-(10-phenothiazinyl)alkyl dialkylsulfonium salts an ω-(10-phenothiazinyl)alkyl halide is first reacted with thiourea to form a thiouronium salt of the formula:

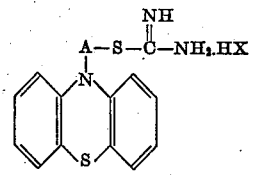

where A is lower alkylene as defined above, and X is a halogen such as bromine or iodine. This intermediate compound is then reacted with an aqueous alcoholic solution of sodium carbonate, preferably with slight heating, to form an ω-(10-phenothiazinyl) lower alkyl mercaptan. This compound is then reacted with an alkyl halide in the presence of an alkali metal alkylate to form an ω-(10-phenothiazinyl) lower alkyl alkylsulfide. Reaction of the latter with an alkyl halide as in our first process described above results in the desired ω-(10-phenothiazinyl) alkyl dialkylsulfonium salt.

Our second procedure for the preparation of these new sulfonium salts may therefore be represented as follows:

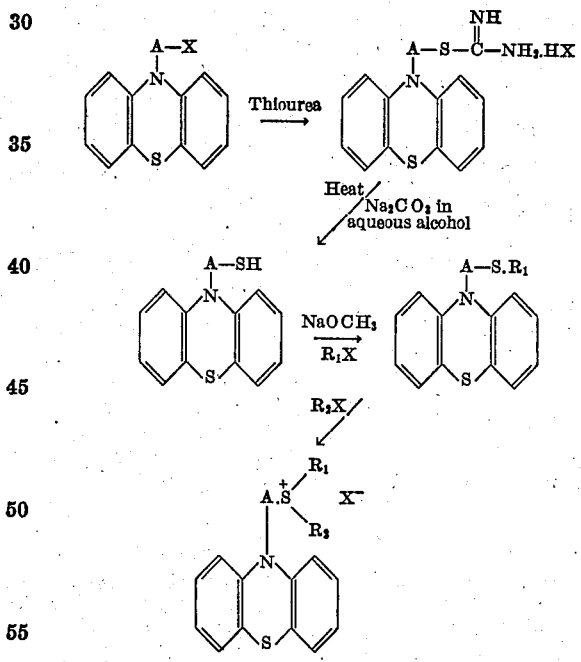

wherein A represents lower alkylene as above defined, $R_1$ and $R_2$ are the same or different lower alkyl radicals and X represents a halogen.

EXAMPLE 1

S-[2'-(10-phenothiazinyl)-1'-methylethyl] pseudothiourea hydrobromide

A solution of 16.0 grams (0.05 mol) of 10-(2'-bromopropyl)-phenothiazine in 50 milliliters of a 1:1 mixture of nitromethane and absolute ethanol was heated under reflux for 8 hours with 3.8 grams (0.05 mol) of thiourea. The red, viscous oil obtained on removal of the solvent by distillation solidified and was recrystallized several times from a mixture of nitromethane and ether to give 4.0 grams of product having a melting point of 187–189° C. This product was S-[2'-(10-phenothiazinyl)-1'-methylethyl] pseudothiourea hydrobromide of empiric formula $C_{16}H_{18}N_3S_2Br$ as confirmed by analyses for carbon, hydrogen and nitrogen. Repetition on a large scale resulted in the desired product in a yield of approximately 67 percent.

EXAMPLE 2

2'-(10-phenothiazinyl)-1'-methylethylmercaptan

The thiouronium salt prepared as described in Example 1 in the amount of 29.0 grams (0.073 mol) was dissolved in 100 milliliters of warm water containing a little alcohol. The resulting warm solution was treated with 3.9 grams (0.037 mol) of sodium carbonate to yield the free base in the form of a heavy oil. The mother liquors were decanted off and the oil washed with water. It was then dissolved in warm, aqueous ethanol and a very small amount of sodium carbonate added. Upon heating a precipitate rapidly appeared in the solution, whereupon heating under reflux was continued for two and one-quarter hours.

The resulting solution was then cooled, diluted with water, and made faintly acid by the addition of hydrochloric acid. The resulting white crystals were removed, and then dissolved and recrystallized from aqueous alcohol solution to yield 6.5 grams of a solid product melting at 137–140° C. This product was 2'-(10-phenothiazinyl)-1'-methylethylmercaptan of empiric formula $C_{15}H_{15}NS_2$. A pure specimen, secured by recrystallization from hexane solution, melted at 140–142° C. Analyses for carbon, hydrogen and nitrogen confirmed the structure.

EXAMPLE 3

2'-(10-phenothiazinyl)-1'-methylethyl methylsulfide 8.5 grams (0.0312 mol) of 2'-(10-phenothiazinyl)-1'-methylethylmercaptan was dissolved in 300 milliliters of absolute alcohol containing a little butanone. 1.77 gram (0.0328 mol) of an alcoholic solution of sodium methylate was added, followed by the addition of 4.60 grams (0.0328 mol) of methyl iodide. The solution was heated under reflux for one hour, the solvents removed, and the residue poured into water. The mixture was extracted with chloroform, and the chloroform extracts dried, then evaporated to give 6 grams of a buff-colored, crude solid product. Crystallization of this product from a mixture of hexane and petroleum ether (boiling point below 40° C.) gave 3.5 grams of a crystalline product in the form of rosettes of needles. Its melting point was 74–75° C. and, upon recrystallization, the melting point of the crystalline product was raised to 75–76° C. This product was 2'-(10-phenothiazinyl)-1'-methylethyl methylsulfide and its empiric formula, $C_{16}H_{17}NS_2$, was confirmed by carbon, hydrogen, nitrogen and sulfur analyses.

EXAMPLE 4

2'-(10-phenothiazinyl)-1'-methylethyl ethylsulfide

This was also prepared from 2'-(10-phenothiazinyl)-1'-methylethyl mercaptan. This mercaptan had previously been made following the procedure described in Example 2.

7.2 grams (0.0264 mol) of this mercaptan were dissolved in 250 milliliters of absolute alcohol containing a little butanone, 1.51 grams (0.028 mol) of sodium methylate and 4.4 grams (0.028 mol) of ethyl iodide. The reaction was carried out and worked up as in Example 3, and there was thus obtained an oily product of which the boiling point was 180–182° C., at 0.06 millimeter of mercury pressure. This product was 2'-(10-phenothiazinyl)-1'-methylethyl ethylsulfide. Analyses for carbon, hydrogen, nitrogen and sulfur confirmed its empiric formula $C_{17}H_{19}NS_2$.

EXAMPLE 5

2'-(10-phenothiazinyl)ethyl methylsulfide

A solution of sodium methylmercaptide was prepared in accordance with the procedure described in Organic Syntheses. A quantity of 10-(2'-chloroethyl) phenothiazine was prepared in accordance with procedures described in the literature.

A solution containing 26.2 grams (0.1 mol) of 10-(2'-chloroethyl) phenothiazine in 500 milliliters of alcohol was then added, drop-wise, to a reflux solution containing 0.225 mol of sodium methylmercaptide dissolved in 200 milliliters of ethanol. The addition was complete in 30 minutes, whereupon refluxing was continued for another three hours.

The reaction mixture was then poured into water and extracted therefrom with chloroform. This chloroform extract was dried over sodium sulfate and evaporated down in vacuo, i.e. at a reduced pressure below atmospheric, thus resulting an an oily residue. This residue was dissolved in a mixture of benzene and hexane, and the insoluble material present in the resulting solution was removed and discarded. When the solution was evaporated down at a reduced pressure less than atmospheric there remained behind 16 grams of a heavy oil. This oil was purified by vacuum distillation at 0.2 millimeter of mercury pressure, and the fraction boiling at 186–190° C. solidified to yield a white solid product. This solid product was 2'-(10-phenothiazinyl) ethyl methylsulfide.

The product as obtained immediately upon solidification melted at 46–47° C., but by recrystallization from ethanol the analytically pure compound melting at 52–54° C. was secured. It had the empiric formula $C_{15}H_{15}S_2N$, as confirmed by analyses for carbon, hydrogen, nitrogen and sulfur.

EXAMPLE 6

3'-(10-phenothiazinyl)propyl methylsulfide

This compound was prepared following the general procedure described in the preceding example by reacting 20 grams (0.0725 mol) of 10-γ-chloropropylphenothiazine, 9.8 grams (0.18 mol) of sodium methoxide and 10.5 grams (0.22 mol) of methylmercaptan in 500 milliliters of absolute ethanol by heating to reflux as described in Example 5. The product resulting was 3'-(10-phenothiazinyl) propyl methylsulfide, a representative sample of which boiled at 174–176° C. at 0.15 millimeter of mercury pressure. Its empiric formula, $C_{16}H_{17}S_2N$, was confirmed by carbon, hydrogen, nitrogen and sulfur analyses.

EXAMPLE 7

2'-(10-phenothiazinyl)-1'-methylethyl dimethylsulfonium iodide 3.5 grams of 2'-(10-phenothiazinyl)-1'-methylethylmethylsulfide (prepared as described in Example 3) and 5 grams of methyl iodide were dissolved in 20 milliliters of nitromethane and the solution allowed to stand in the dark for 18 hours at room temperature. The addition of dry ether to the solution resulted in a solid product melting at 125° C. Recrystallization of this solid product from a mixture of alcohol and isopropyl ether did not result in any change in its melting point. This product was 2'-(10-phenothiazinyl)-1'-methylethyl dimethylsulfonium iodide, having the empiric formula $C_{17}H_{20}NS_2I$ as confirmed by analyses for nitrogen, iodine and sulfur.

EXAMPLE 8

2'-(10-phenothiazinyl)-1'-methylethyl diethylsulfonium iodide 6.0 grams of 2'-(10-phenothiazinyl)-1'-methylethylethylsulfide prepared as in Example 4, were dissolved in 10 milliliters of nitromethane which also contained an excess amount of ethyliodide. There was thus secured 2.1 grams of a crude salt which melted at 127–129° C. (dec.). Upon recrystallization of the salt from a mixture of methanol and ether a purified product of melting point 136–137° C. was secured. This was 2'-(10- phenothiazinyl)-1'-methylethyl diethylsulfonium iodide of empiric formula C₁₉H₂₄NS₂I. Its structure was confirmed by analysis.

EXAMPLE 9

*2'-(10-phenothiazinyl) ethyl dimethylsulfonium iodide*

0.5 gram of 2'-(10-phenothiazinyl) ethyl methylsulfide, prepared as described in Example 5, was dissolved in 10 milliliters of ether and approximately 2 grams of methyl iodide were added to the solution. The reaction mixture was allowed to stand in the dark for 48 hours at room temperature. A solid product in the form of fine white needles melting at 113–115° C. was secured. Upon recrystallization from a mixture of methanol and ether, a crystalline product, melting at 119–120° C. resulted. This product was 2'-(10-phenothiazinyl)ethyl dimethylsulfonium iodide of empiric formula C₁₆H₁₈NS₂I. Its structure was confirmed by analyses for nitrogen, sulfur and iodine.

EXAMPLE 10

*2'-(10-phenothiazinyl) ethyl dimethylsulfonium bromide*

1.0 gram of 2'-(10-phenothiazinyl) ethyl methylsulfide, prepared as described in Example 5, was dissolved in 15 milliliters of a 25 percent alcoholic solution of methyl bromide. The resulting solution was allowed to remain in the refrigerator at a low temperature for 11 days. Upon diluting the reaction mixture with a large volume of dry ether, there was secured a solid product in the form of well-formed prisms. After recrystallization from a mixture of absolute alcohol and ether the purified solid product had a melting point of 149–151° C. (dec.). This product was 2'-(10-phenothiazinyl) ethyl dimethylsulfonium bromide of empiric formula $$C_{16}H_{18}NS_2Br$$

This empiric formula was confirmed by analysis.

EXAMPLE 11

*3'-(10-phenothiazinyl) propyl dimethylsulfonium iodide*

4.0 grams of 3'-(10-phenothiazinyl) propyl methylsulfide, prepared as described in Example 6, was dissolved in 10 milliliters of ether. 10 grams of methyl iodide were then added, and the solution allowed to stand at room temperature in the dark. After 24 hours an oily product precipitated. This was then dissolved in methanol and crystallized from this solvent. There was thus secured 3.4 grams of a product melting at 139–140° C., and this melting point was not changed by recrystallization from methanol. The product was 3'-(10-phenothiazinyl) propyl dimethylsulfonium iodide, of empiric formula C₁₇H₂₀NS₂I. The structure was confirmed by analyses for nitrogen, sulfur and iodine.

Wherever the term "alkylene" is used herein, it is our intention to include within the meaning of said term alkylene groups which include alkyl substituents.

We claim:

1. A sulfonium salt of the formula

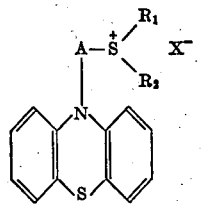

where A is selected from lower alkylene groups containing from 2 to 3 carbon atoms, R₁ and R₂ each represent lower alkyl, and X is a halogen selected from the group consisting of bromine and iodine.

2. 2'-(10-phenothiazinyl)-1'-methylethyl dimethylsulfonium iodide.

3. 2'-(10-phenothiazinyl)-1'-methylethyl diethylsulfonium iodide.

4. 2'-(10-phenothiazinyl) ethyl dimethylsulfonium iodide.

5. 2'-(10-phenothiazinyl) ethyl dimethylsulfonium bromide.

6. 3'-(10-phenothiazinyl) propyl dimethylsulfonium iodide.

7. A compound of the formula

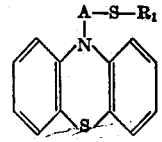

wherein A is selected from lower alkylene groups containing from 2 to 3 carbon atoms and R₁ represents lower alkyl.

8. 2'-(10-phenothiazinyl)-1'-methylethyl methylsulfide.
9. 2'-(10-phenothiazinyl)-1'-methylethyl ethylsulfide.
10. 2'-(10-phenothiazinyl) ethyl methylsulfide.
11. 3'-(10-phenothiazinyl) propyl methylsulfide.
12. A compound of the formula

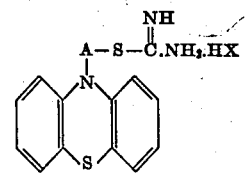

wherein A is selected from lower alkylene groups containing from 2 to 3 carbon atoms and X represents a halogen selected from the group which consists of bromine and iodine.

13. S-[2'-(10-phenothiazinyl)-1'-methylethyl] pseudothiourea hydrobromide.

14. A compound of the formula

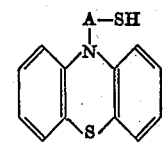

wherein A is selected from lower alkylene groups containing from 2 to 3 carbon atoms.

15. 2'-(10-phenothiazinyl)-1'-methylethylmercaptan.

16. The process which comprises heating at reflux in a mixture of nitromethane and ethanol an ω-(10-phenothiazinyl) alkyl halide and thiourea, thereby forming an S-[ω-(10-phenothiazinyl)-alkyl] pseudothiourea hydrohalide; refluxing said latter compound with an aqueous alcoholic alkali metal carbonate, thereby forming an ω-(10-phenothiazinyl)alkyl mercaptan; adding said mercaptan to an alcoholic solution of an alkyl halide in the presence of an alkaline condensing agent and heating at reflux, thereby forming an ω-(10-phenothiazinyl) alkyl alkylsulfide; and adding an alkyl halide to said latter compound and permitting the resulting mixture to stand at room temperature in the dark, thereby forming an ω-(10-phenothiazinyl)alkyl dialkylsulfonium salt.

17. The process which comprises heating at reflux in a reaction medium comprising a 1:1 mixture of nitromethane and absolute ethanol, an ω-(10-phenothiazinyl) alkyl halide and thiourea, thereby forming an S-[ω-(10-phenothiazinyl)alkyl] pseudothiourea hydrohalide.

18. The process of preparing an ω-(10-phenothiazinyl)-alkyl alkylsulfide which comprises adding an ω-(10-phenothiazinyl) alkylmercaptan to a solution of an alkyl halide in a reaction medium comprising an alkali metal alcoholate, and heating at reflux.

19. The process of preparing an ω-(10-phenothiazinyl)-alkyl alkylsulfide which comprises heating at reflux a reaction mixture comprising an ω-(10-phenothiazinyl)-alkyl halide and an alkali metal alkylmercaptide, said reactants being suspended in a liquid diluent.

20. The process of preparing an ω-(10-phenothiazinyl)-alkyl dialkylsulfonium halide which comprises permitting an ω-(10-phenothiazinyl)-alkyl alkylsulfide and an alkyl halide to stand in the dark at room temperature, and recovering said compound from the reaction mixture.

21. The process of preparing an ω-(10-phenothiazinyl)-alkyl mercaptan which comprises adding an S-[ω-(10-phenothiazinyl)-alkyl]-pseudothiourea hydrohalide to an aqueous alcoholic solution of an alkali metal carbonate and heating the reaction mixture to reflux.

References Cited in the file of this patent

UNITED STATES PATENTS

| | | |
|---|---|---|
| 2,659,724 | Zerbe | Nov. 17, 1953 |
| 2,738,349 | Gailliot et al. | Mar. 13, 1956 |

FOREIGN PATENTS

| | | |
|---|---|---|
| 1,091,700 | France | Nov. 3, 1954 |